US012561521B2

(12) United States Patent
Martin-Short et al.

(10) Patent No.: US 12,561,521 B2
(45) Date of Patent: Feb. 24, 2026

(54) PERSONA AND APPLICATION MATCHING USING LARGE LANGUAGE MODELS

(71) Applicant: DATA.AI INC., San Francisco, CA (US)

(72) Inventors: Robert Martin-Short, Berkeley, CA (US); Lorre Samantha Atlan, St. Louis, MO (US); Jess Robert Kerlin, Walnut Creek, CA (US); Ramanpreet Singh Buttar, Delta (CA)

(73) Assignee: Data.ai Inc., San Francisco, CA (US)

( * ) Notice: Subject to any disclaimer, the term of this patent is extended or adjusted under 35 U.S.C. 154(b) by 155 days.

(21) Appl. No.: 18/530,155

(22) Filed: Dec. 5, 2023

(65) Prior Publication Data

US 2024/0184983 A1 Jun. 6, 2024

Related U.S. Application Data

(60) Provisional application No. 63/430,597, filed on Dec. 6, 2022.

(51) Int. Cl.
| | |
|---|---|
| *G06F 40/20* | (2020.01) |
| *G06F 16/435* | (2019.01) |
| *G06F 16/901* | (2019.01) |
| *G06F 16/9535* | (2019.01) |
| *G06F 40/295* | (2020.01) |

(Continued)

(52) U.S. Cl.
CPC ............ *G06F 40/20* (2020.01); *G06F 16/435* (2019.01); *G06F 16/9024* (2019.01); *G06F*

*16/9535* (2019.01); *G06F 40/295* (2020.01); *G06F 40/58* (2020.01); *G06N 20/00* (2019.01)

(58) Field of Classification Search
CPC .............. G06F 16/9535; G06F 16/435; G06F 16/9024; G06F 40/20; G06N 20/00; G06N 5/022
See application file for complete search history.

(56) References Cited

U.S. PATENT DOCUMENTS

| | | | | |
|---|---|---|---|---|
| 2014/0149582 A1* | 5/2014 | Chien | ...................... | G06F 8/62 709/224 |
| 2015/0112831 A1* | 4/2015 | Jackson | ............. | G06Q 30/0631 705/26.7 |

(Continued)

*Primary Examiner* — Samuel G Neway
(74) *Attorney, Agent, or Firm* — VLP Law Group, LLP

(57) ABSTRACT

A graph includes nodes representing applications and tags describing subjective qualities of the applications. The system responds to queries for user personas by using an LLM to match the persona to applications in the graph. The system receives a natural language query describing a persona. The system generates a prompt for an LLM based on the query and provides the prompt to the LLM for execution. The system receives, as output from the LLM, candidate applications. The system inputs the candidate applications into a classifier trained to classify candidate applications into known applications, applications that already exist in a graph. The system receives, as output from the classifier, known applications. The system determines, for each known application, a quality score of the known application and determines that the quality score exceeds a quality score threshold. In response, the system provides the known applications for display at a user interface.

20 Claims, 11 Drawing Sheets

(51) Int. Cl.
      *G06F 40/58*       (2020.01)
      *G06N 20/00*       (2019.01)

(56)              References Cited

U.S. PATENT DOCUMENTS

2016/0171589 A1*   6/2016   Glover ............... G06Q 30/0631
                                                705/26.7
2018/0181663 A1*   6/2018   Hashimoto ........... G06F 16/248
2023/0334514 A1*   10/2023   Hernandez Rivera .......................
                                          G06Q 30/01
2024/0184983 A1*   6/2024   Martin-Short ......... G06N 5/022
2024/0185002 A1*   6/2024   Atlan ..................... G06N 20/00
2024/0185137 A1*   6/2024   Atlan ..................... G06N 20/00

* cited by examiner

Extract signals from new application
310

Input signals into machine learning model
320

Receive, as output from machine learning model, tags for new application
330

Update graph to include nodes for new application, tags linked to nodes with edges
340

Receive query corresponding to tag
350

Provide response to database query based on nodes for new application
360

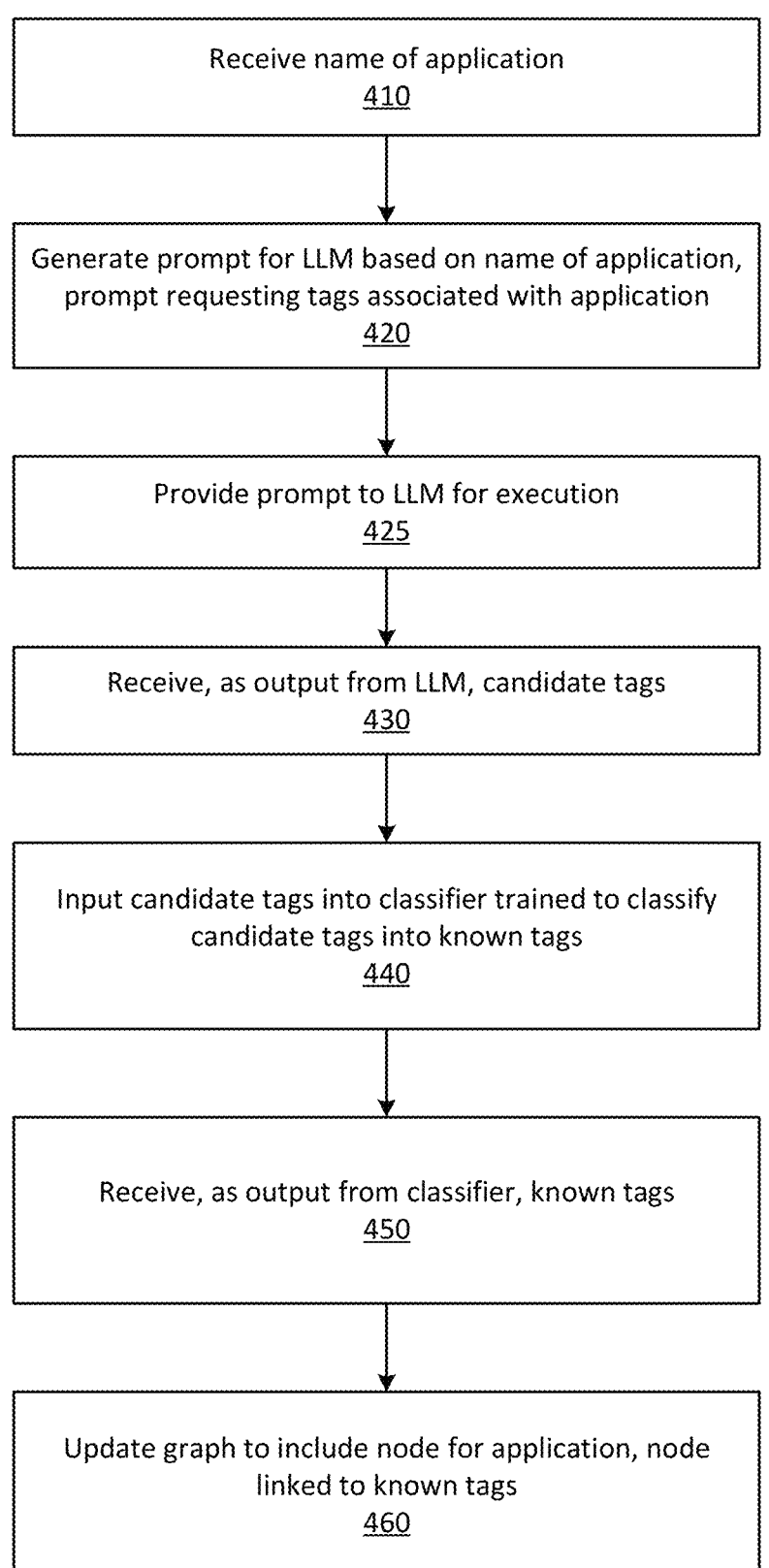

Receive name of application
410

Generate prompt for LLM based on name of application, prompt requesting tags associated with application
420

Provide prompt to LLM for execution
425

Receive, as output from LLM, candidate tags
430

Input candidate tags into classifier trained to classify candidate tags into known tags
440

Receive, as output from classifier, known tags
450

Update graph to include node for application, node linked to known tags
460

FIG. 4

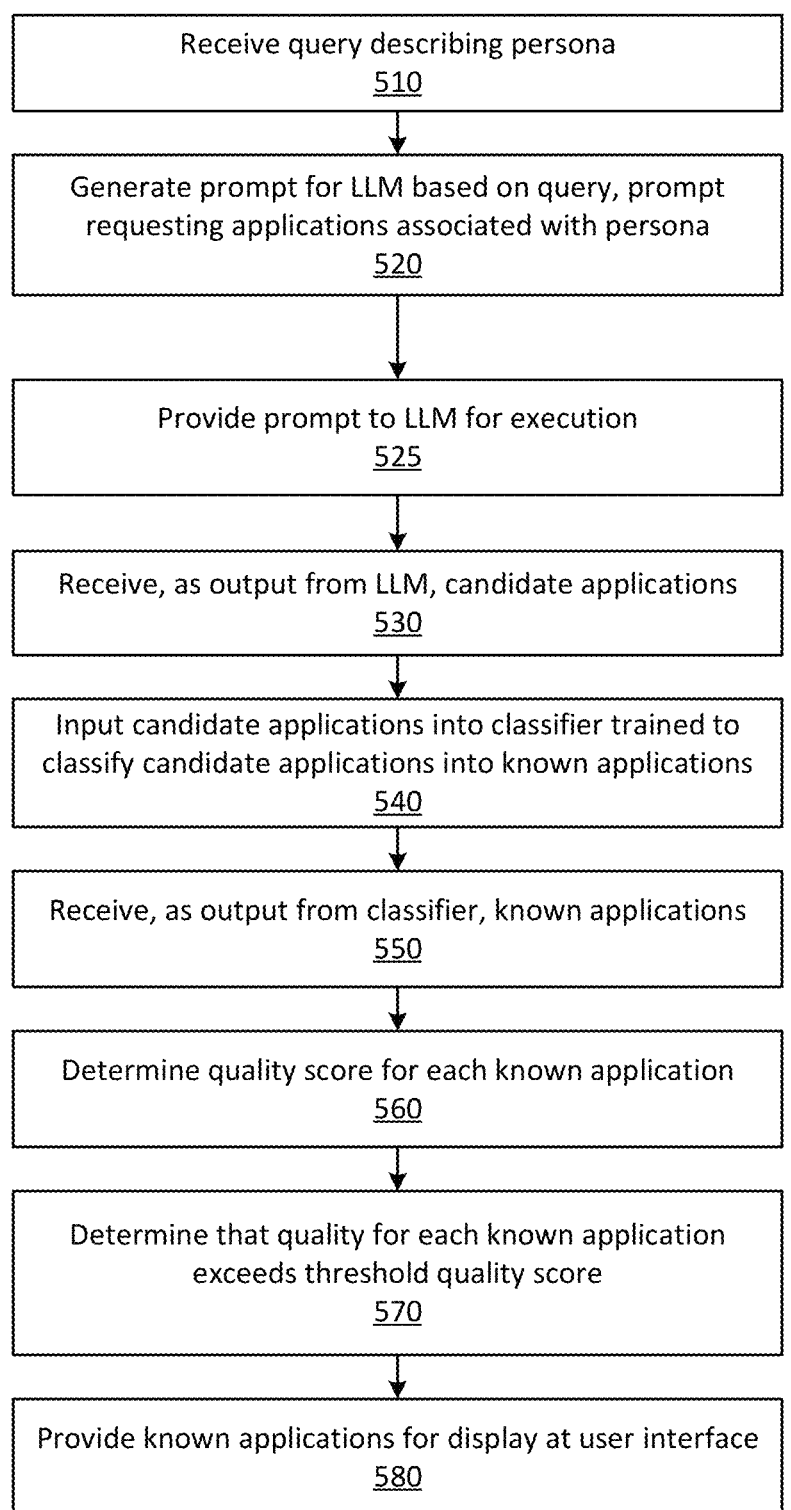

Receive query describing persona
510

Generate prompt for LLM based on query, prompt
requesting applications associated with persona
520

Provide prompt to LLM for execution
525

Receive, as output from LLM, candidate applications
530

Input candidate applications into classifier trained to
classify candidate applications into known applications
540

Receive, as output from classifier, known applications
550

Determine quality score for each known application
560

Determine that quality for each known application
exceeds threshold quality score
570

Provide known applications for display at user interface
580

FIG. 5

Tags

Signals

Application

800

805

810

|         | Game App | Airline App | Dating App | Hotel App | Sports App | Fitness App |
|---------|----------|-------------|------------|-----------|------------|-------------|
| Game App    | 1   | 0.3 | 0.5 | 0.4 | 0.9 | 0.8 |
| Airline App | 0.3 | 1   | 0.7 | 0.9 | 0.5 | 0.4 |
| Dating App  | 0.5 | 0.7 | 1   | 0.6 | 0.6 | 0.8 |
| Hotel App   | 0.4 | 0.9 | 0.6 | 1   | 0.3 | 0.2 |
| Sports App  | 0.9 | 0.5 | 0.6 | 0.3 | 1   | 0.9 |
| Fitness App | 0.8 | 0.4 | 0.8 | 0.2 | 0.9 | 1   |

FIG. 8

PERSONA AND APPLICATION MATCHING USING LARGE LANGUAGE MODELS

CROSS REFERENCE TO RELATED APPLICATIONS

This application claims the benefit of U.S. Provisional Application No. 63/430,597, filed Dec. 6, 2022, which is incorporated by reference in its entirety.

TECHNICAL FIELD

The disclosure generally relates to the field of machine learning, and more particularly relates to using supervised models to apply tags to applications, augment a graph to include relationships between applications and applied tags, and respond to queries using the graph.

BACKGROUND

Subjective labels of applications (e.g., mobile applications) may be useful for analytics and report generation relating to those applications. For example, subjective categorization of an application as pertaining to people who have a certain marital status or who fit a certain habit structure may be useful in comparative analytics of other applications that fit the same subjective categorization. However, it is not scalable to manually apply labels across millions of new applications, many of which newly come to existence on a daily basis. Moreover, human labeling of applications may suffer accuracy issues and inconsistency issues, given that the subjectivity of each label may be perceived differently by different labelers. Automating this labeling using heuristics may have accuracy issues, in that detectable parameters for heuristic development may not evenly align with category assignment that an expert human labeler would apply.

SUMMARY

Systems and methods are disclosed herein for generating tags for applications, augmenting a graph to account for relationships between applications and tags, and responding to queries using the graph. A graph may be initially seeded with nodes representing applications and users, and one or more tags may be applied to those nodes. Each tag describes a subjective quality of the application to which it corresponds. Nodes may be stored in the graph as being mapped to a data structure, the data structure containing signals extracted in relation to the application or user that the node represents.

A graph augmentation system may generate tags for applications using a supervised machine learning model. The supervised machine learning model may be trained using nodes in the graph—and their corresponding signals and tags—as training examples, where the tags act as labels on the training examples. The supervised machine learning model may take as input signals extracted in relation to an application, and output one or more predicted tags for the application. The graph may be updated to reflect the application and predicted tags.

In some embodiments, the graph augmentation system extracts signals from a newly detected application. The graph augmentation system inputs the signals into a machine learning model, and receives, as output from the model, tags that correspond to the new application and levels of confidence for each tag. The graph augmentation system updates the graph to include one or more nodes corresponding to the new application, with the tags linked to the one or more nodes with an edge that has a weight corresponding to the corresponding level of confidence. The graph augmentation system receives a query corresponding to the tag and provides a response to the query based on the one or more nodes corresponding to the new application.

The graph augmentation system may generate tags for applications using a large language model (LLM). The graph augmentation system may prompt the LLM with a name of an application and a request to generate tags (e.g., descriptions, labels, interests) for the application. The LLM may output candidate tags describing the application, and the graph augmentation system may use a classifier to classify the candidate tags into tags in the graph.

In some embodiments, the graph augmentation system receives the name of an application. The graph augmentation system generates a prompt for an LLM based on the name of the application. The prompt includes a request for one or more tags associated with the application. The one or more tags describe user interests associated with the application. The graph augmentation system provides the prompt to the LLM for execution and receives, as output from the LLM, a plurality of candidate tags. The graph augmentation system inputs the plurality of candidate tags into a classifier. The classifier is trained to classify candidate tags into known tags. Known tags are tags that already exist in a graph. The graph augmentation system receives, as output from the classifier, a plurality of known tags. The graph augmentation system updates the graph to include a node corresponding to the application. The node is linked to the plurality of known tags with an edge weighted by the quality of the classification match.

The graph augmentation system may respond to queries using information in the graph. The graph augmentation system may respond to queries for tags or applications by providing connected nodes. The graph augmentation system may respond to queries for a user persona by using an LLM to match the persona to applications in the graph.

In some embodiments, the graph augmentation system receives a query from a user of a client device where the query is a natural language input describing a persona. The graph augmentation system generates a prompt for an LLM based on the query. The prompt includes a request for one or more applications associated with the persona. The graph augmentation system provides the prompt to the LLM for execution and receives, as output from the LLM, a set of candidate applications. The graph augmentation system inputs the plurality of candidate applications into a classifier. The classifier is trained to classify candidate applications into known applications, applications that already exist in a graph. The graph augmentation system receives, as output from the classifier, a plurality of known applications. The graph augmentation system determines, for each known application in the plurality of known applications, a quality score of the known application and determines that the quality meets a quality threshold. In response, the graph augmentation system provides the known applications for display in a user interface.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates a flow diagram for generating tagged interests for an application according to one embodiment.

FIG. 5 illustrates a flow diagram for generating application recommendations for a persona, according to one embodiment.

FIG. 8 illustrates an example cross-app affinity table, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
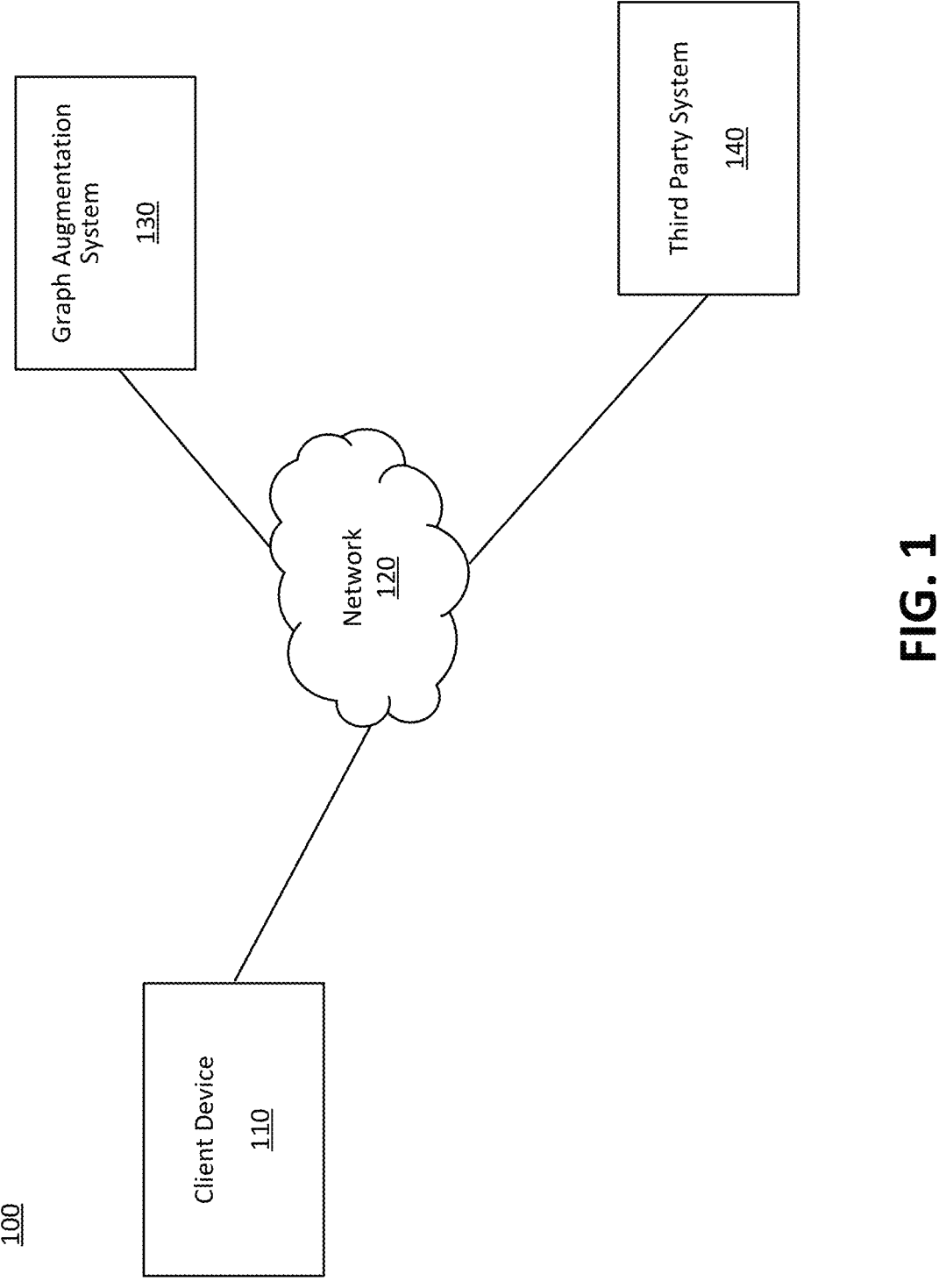
FIG. 1 illustrates one embodiment of a computing environment for a graph augmentation system.

FIG. 1 illustrates a block diagram of a computing environment for a graph augmentation system, according to an embodiment. Environment 100 includes one or more client devices 110, a graph augmentation system 130, and one or more third party systems 140 that communicate with each other over a network 120. FIG. 1 illustrates one client device 110 and one third party system 140, but there may be multiple instances of each of these entities, and the functionality of the graph augmentation system 130 may be distributed or replicated across multiple servers.

A client device 110 is a device operated by one or more users (e.g., administrator, analyst, application developer) associated with a client. The term "application," as used herein (sometimes referred to as a "client application"), may refer to a computer program or a software application that provides a set of services to its accessing users. A client application may be a native application, a web-based application, or a hybrid application. The client application may be a mobile application.

The client device 110 is a computing device capable of receiving user input as well as transmitting and/or receiving data via the network 120. In some embodiments, a client device 110 is a smartphone, a tablet, or a conventional computer system, such as a desktop or laptop computer. Alternatively, a client device 110 may be a device having computer functionality that accesses a set of mobile applications. A client device 110 is configured to communicate via the network 120. In some embodiments, the client device 110 executes an application allowing a user of the client device 110 to interact with the graph augmentation system 130. For example, the client device 110 executes a browser application that may enable interaction between the client device 110 and the graph augmentation system 130 via the network 120. In an embodiment, a client device 110 interacts with the graph augmentation system 130 through an application programming interface (API) running on a native operating system of the client device 110, such as IOS® or ANDROID™. Exemplary interactions may include transmitting queries for processing by the graph augmentation system 130, and receiving responses thereto based on data within the graph.

The graph augmentation system 130 generates tags for applications, augments a graph to account for relationships between applications and tags, and responds to queries using the graph. Generally speaking, a graph may include nodes that represent applications or users, the nodes being mapped to signals extracted in association with the application or user that the node represents. Nodes may be annotated with tags or may connect to nodes representing tags. Tags may be subjective in nature and in some cases, manually determined. Tags for an application may relate to a category, attribute, motivation, or function of the application. Given scalability, consistency, and accuracy issues, it is impractical or computationally expensive to generate tags for applications through manual curation or heuristics, especially for new applications as they are released. To this end, responsive to detecting a new application, the graph augmentation system 130 extracts signals relating to that new application and applies those signals to a machine learning model, the model trained using node data presently existing in the graph to output predicted tags for the new application. The graph augmentation system 130 may use similar techniques to update or add new tags to "known" applications, applications that already exist in the graph. The graph augmentation system 130 may similarly generate tags for new or known applications using a large language model (LLM). The graph augmentation system 130 may prompt the LLM with a name of an application and a request to generate tags (e.g., interests, labels, descriptions) for the application. The graph augmentation system 130 may use the information in the graph—the application nodes and tags—to respond to queries. The graph augmentation system 130 may respond to queries for a user persona by using an LLM to match the user persona to applications in the graph. Details on the particulars of how graph augmentation system 130 achieves the above are described below with respect to FIGS. 2-9.

Figure 2:
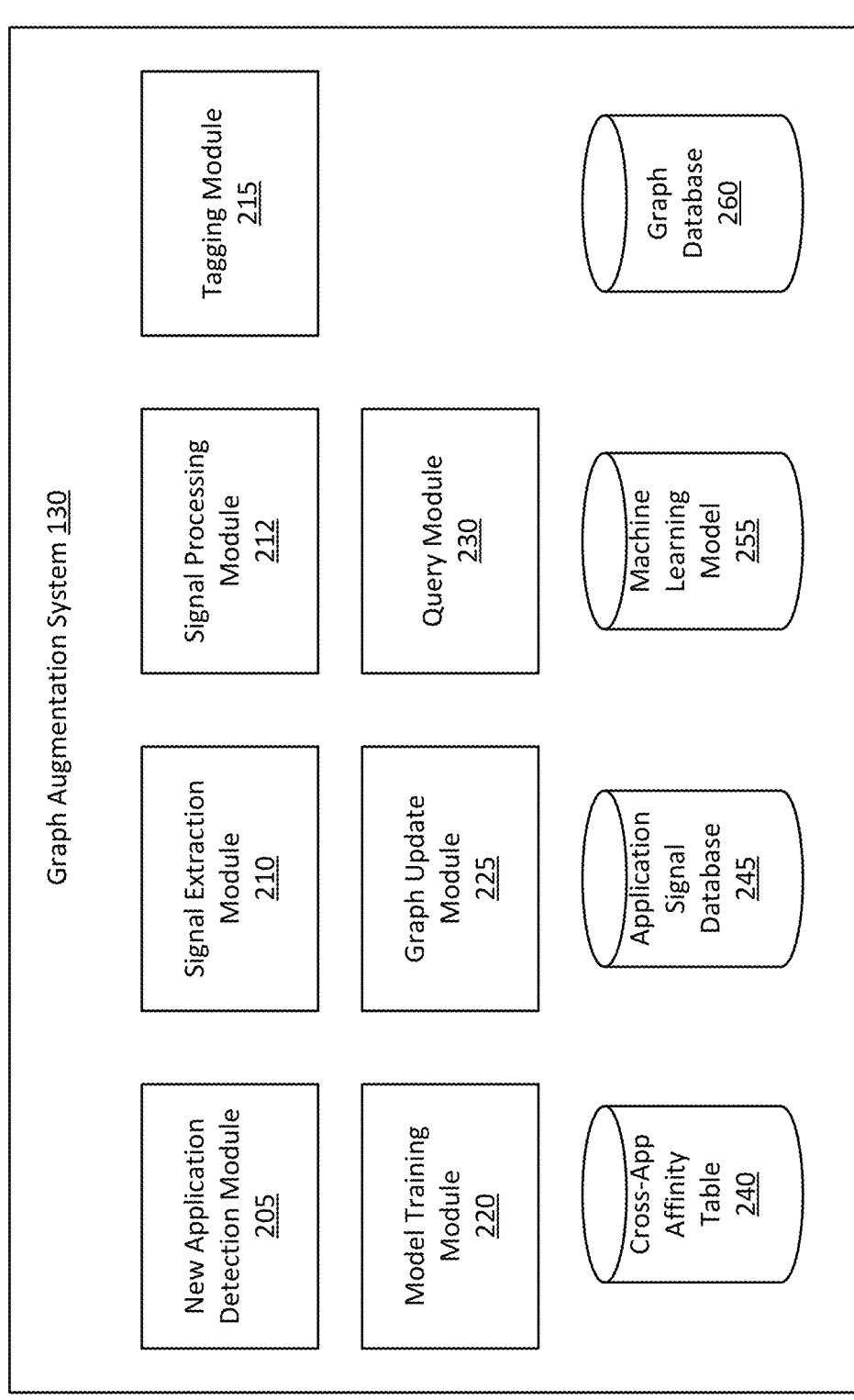
FIG. 2 illustrates one embodiment of modules and databases used by the graph augmentation system.

FIG. 2 illustrates a block diagram of modules and databases used by the graph augmentation system, according to an embodiment. The graph augmentation system 130 as depicted in FIG. 2 includes a new application detection module 205, a signal extraction module 210, a signal processing module 212, a tagging module 215, a model training module 220, a graph update module 225, a query module 230, a cross-app affinity table 240, an application signal database 245, a machine learning model database 255, and a graph database 260. The modules and databases depicted in FIG. 2 are merely exemplary; more or fewer modules and/or databases may be used by the graph augmentation system 130 to achieve the functionality described herein. Moreover, these modules and/or databases may be located in a single server or may be distributed across multiple servers. Some functionality of the graph augmentation system 130 may be installed directly on the client device 110 as a component of an application associated with the graph augmentation system 130.

The graph, stored in graph database 260, contains a set of nodes and tags, where a node may represent an entity, such as an application or a user of one or more applications. Each node has a corresponding data structure that maps signals extracted with respect to the entity to which the node corresponds. A signal includes descriptive data about a given entity to which the node corresponds. Where the node is for an application, a signal may include, for example, one or more of a keyword, phrase, description, media, and metadata associated with the application. For example, a signal may be the name of the application. Metadata may include demographic data of users of the application, user identification numbers for users of the application, or the presence of videos, images, or other media content. Where the node represents a user, a signal may include data used or produced by the applications, for example, usage habits, and demographic information. The term "user" used herein may refer to an individual or to an aggregate profile, made up of individuals having one or more common characteristics. For example, a user may refer to a group of individuals within the same demographic, such as single females with age ranging from 25-30. As used herein, the term "tag" may refer to a description of a node. A tag may exist in the graph as an annotation of a node representing an application or user or may exist in the graph as a node itself. The tag may be objective or subjective in nature. Tags for an application may relate to a category, attribute, motivation, or function of the application. For example, where a tag is a description of a node representing an application used for running, the tag may be "fitness" or "lifestyle." In another example, a tag that is a description of a user may be an attribute of the user, such as "single," a motivation of the user, such as "to find a romantic partner," or an interest of a user, such as "dating." The graph also includes edges. An edge is a connection between two nodes, between two tags, or between a node and a tag. An edge between a node representing a user and a node representing an application may indicate that the application is used by the user. An edge between a node representing an application and a tag may indicate that the tag describes the application. In an embodiment, an edge may be weighted to represent the strength of a connection or the level of confidence in the connection. Edge weight may be determined by a confidence level, described with respect to module 215 of FIG. 2.

The new application detection module 205 detects a new application that has not been added as a node on the graph. The new application detection module 205 may detect such an application through any of or a combination of techniques, such as by receiving push notifications from application stores when new applications are added, by periodically scraping application stores for applications and comparing them to known applications that already exist in the graph, by periodically scraping web pages that announce new applications and locating the announced new application in the application store, by looking through signals associated with user nodes for applications used by known users but not added as new applications, and so on. In some embodiments, the new application detection module 205 may monitor for new signals associated with known applications in the graph.

The signal extraction module 210 extracts one or more signals associated with an application. The signal extraction module 210 may extract a signal from the application, an application store, the application signal database 245, or an external source. The external source may contain data related to the performance history of the application, market research data, or publicly reported data. The signal extraction module 210 may extract signals for known applications that already exist in the graph. For example, the signal extraction module 210 may extract signals for a known application after an update to the application, as an update may add new features or functions to the application. The signal extraction module 210 may extract signals for new applications. For example, the signal extraction module 210 may extract signals for a new application in response to the new application detection module 205 detecting the new application. The signal extraction module 210 extracts the signals by stepping through data associated with the application and storing some or all of the data in the application signal database 245. Various manners of signal extraction follow and may be used in the alternative or in combination with one another to achieve a robust signal set across a variety of techniques.

In some embodiments, the signal extraction module 210 may extract signals from the application itself. The signal extraction module 210 may extract signals from the application's graphical user interface (GUI). The signal extraction module 210 may scan the GUI of the application and store information displayed on each page of the application. For example, the signal extraction module 210 may scan the GUI for text and extract text. Likewise, the signal extraction module 210 may scan the GUI for media content and extract images and video. The signal extraction module 210 may extract text information embedded within images and video. In some embodiments, the signal extraction module 210 may extract information pertaining to the quality or quantity of displayed information. For example, the signal extraction module 210 may detect that an application is text-only, or that a page of the application is primarily made up of image content, audio content or video content. The signal extraction module 210 may extract contextual information (e.g., links to external applications or web pages), sub-categorizations of any given type of media presented (e.g., cartoon video or human being), length of media and conclusions drawn therefrom (e.g., a 90-minute video corresponding to a movie), and any other information derivable from a given page of the application. In some embodiments, the signal extraction module 210 may extract screen grabs of a given page of the application's GUI.

In some embodiments, the signal extraction module 210 extracts signals from outside the application. For example, the signal extraction module 210 may extract signals from an application store. The application store may host a page from which a user can download the application and may also present various information related to the application, such as text, video, images, and so on. The signal extraction module 210 extracts signals from the application store by stepping through and storing the presented information. The signal extraction module 210 may additionally or alternatively extract signals from an application developer and/or from a third-party source. The extracted signals may include individual or anonymized information about users of the application, such as their demographics, usage habits, and so on.

The signal processing module 212 may filter and process signals. The signal processing module 212 may process signals to reduce the total number of signals, produce more relevant signals, or reduce processing efforts in further modules. In some embodiments, the signal processing module 212 groups one or more signals into a single signal. For example, a common phrase may be used as a signal instead of the individual components of the phrase. In some embodiments, the signal processing module 212 separates one signal into multiple signals. For example, the signal processing module 212 may separate a sentence into single-word signals. In another example, for a signal that includes both text and media, the signal processing module 212 may separate the text component into one signal and the media component into another. In some embodiments, the signal processing module 212 may filter out signals or part of signals. For example, the signal processing module may filter out signals that have a frequency below a threshold frequency (e.g., a word that appears once). In another example, the signal processing module 212 may filter out articles and prepositions such as "the" and "in." In an additional example, for a signal that is an image or a screen grab of an application, the signal processing module 212 may apply bounding boxes to regions of interest or perform image processing techniques to otherwise filter information. In another example, the signal processing module 212 may remove non-text characters from the signal (e.g., from an application name). The signal processing module 212 may perform other types of pre-processing, such as translating signals into English.

The tagging module 215 assigns tags to an application. For a given node (e.g., application node), the tagging module 215 may assign one or more tags to the node as part of a data structure that includes other information about the node (e.g., signals extracted with reference to the node). In some embodiments, the tagging module 215 assigns known tags to the application. A known tag is a tag that already exists in the graph and may be assigned to other nodes. Known tags may be stored in the graph database 260 along with nodes and signals of nodes. In some embodiments, the tagging module 215 generates new tags and assigns the new tags to an application. New tags are tags that do not already exist in the graph.

In some embodiments, the tagging module 215 determines tags to assign to an application by matching signals extracted from the application to keywords and mapping keywords to known tags. In some embodiments, the tagging module 215 may determine if a signal matches a keyword by computing an embedding for the signal and an embedding for the keyword (e.g., through the word2vec technique) and computing a similarity score between the two embeddings (e.g., through cosine similarity). The tagging module 215 may compare the similarity score to a threshold and, in response to the score exceeding the threshold, determine that the signal matches the keyword. In some embodiments, the tagging module 215 may determine if a signal matches a keyword by using a fuzzy matching algorithm (e.g., Levenshtein distance). The tagging module 215 may receive a score as output of the fuzzy matching algorithm and compare the score to a threshold. In response to the score exceeding the threshold, the tagging module 215 may determine that the signal matches the keyword. For example, for a signal "role-player video game," the tagging module 215 may determine that the keyword "mobile game" is a match. The tagging module 215 may map the keyword to a known tag and assign the known tag to the application. For example, the tagging module 215 may map the keyword "mobile game" to a known tag "gaming" and assign the known tag to the application. In some embodiments, the tagging module 215 may find a match between an image or video signal and a text keyword or vice versa. In these embodiments, the tagging module 215 may perform more complex operations to compute a similarity score, for example translating images and text to the same embedding space (e.g., with a CLIP model) and comparing their embeddings. In some embodiments, the tagging module 215 may keep track of the number of signals that map to a given tag and assign a confidence level for the tag, the confidence level representing how well the tag describes or relates to the application.

In some embodiments, the tagging module 215 determines tags to assign to an application by applying a machine learning model to the signals extracted from the application. The tagging module 215 inputs the signals into the machine learning model (e.g., a model in the machine learning model database 255) and receives, as output, one or more known tags for the application. In some embodiments, the machine learning model may also provide a confidence level corresponding to each known tag. The tagging module 215 may compare the confidence level for each tag to a threshold confidence level and, in response to the confidence level not exceeding the threshold confidence level, remove the tag from the tags assigned to the application. Training of the machine learning module is described with respect to the model training module 220. The tagging module 215 may input all or some of the signals into the machine learning model.

In some embodiments, the tagging module 215 may weight signals before input into the machine learning model. The tagging module 215 may weight signals based on signal frequency, type of signal, historical information on how different signals affect the output of the model (e.g., if a signal is known to throw-off the model), preliminary knowledge of the function of the application, knowledge of the function of the application gained during the signal extraction process, or otherwise. For example, the tagging module 215 may highly weight a signal corresponding to the category of the application extracted from an application store or a signal corresponding to the name of the application. The tagging module 215 may filter out signals by reducing weights of signals to zero. Filtering signals provides a technical advantage of reducing the dimension of the input to the machine learning model, thus reducing the compute power required to run the machine learning model.

In some embodiments, the tagging module 215 may select the machine learning model from a plurality of candidate machine learning models based on the signals of the application. The candidate models may each be trained (e.g., by the model training module 220) on a different set of signals such that they are each tuned to a particular type of application. For example, candidate machine learning models may include a model trained for gaming applications, a model trained for news applications, and a model trained for video streaming applications. The tagging module 215 may compare the signals of the application to signals corresponding to each of the candidate models (e.g., the signals on which those models were trained). The tagging module 215 may perform this comparison before or after filtering and/or weighting signals. The tagging module 215 may select the candidate model with the highest number of matching signals and may input the signals of the application (e.g., after filtering and/or weighting) into the selected model to predict a tag. For example, if an application has signals corresponding to video streaming and playback, the tagging module 215 may select a model trained for video streaming applications. As each candidate model is tuned to a particular application, each candidate model may require less and lower dimension training data, resulting in less processing power required to train the models. Moreover, the candidate models may produce less noisy and more accurate tags for the application.

In some embodiments, the tagging module 215 determines tags to assign to an application by generating tags using a large language model (LLM). In some embodiments, the model training module 220 may train the LLM and store it in the machine learning model database 225 for the tagging module 215 to retrieve. In some embodiments, the LLM may be external to the graph augmentation system 130 and, as such, training of the LLM may occur outside of the training module 220. The LLM may be an open source LLM. The tagging module 215 may generate the set of tags based on the name of the application. The signal extraction module 210 may extract the name of the application as a signal or may receive the name of the application (e.g., from a user of the client device 110). The signal processing module 212 may sanitize the name of the application. Sanitizing the application name may include translating the application name into English if it is not already or removing non-text characters from the application name.

The tagging module 215 generates a prompt for input into the LLM. The prompt may include the name of the application and a request for the LLM to generate one or more tags corresponding to the application. As tags may relate to an interest, category, attribute, motivation, or function of the application, the tagging module 215 may generate the prompt to ask for a set of interests, categories, attributes, motivations, or functions of the application. For example, the tagging module 215 may generate the following prompt, > You are a master app labeler. You have deep understanding of the interests and user preferences of apps. Give me the top ten ranked interests for <application name>, provide them in <format>, consider these <moderation rules>.

In some embodiments, the graph may be populated with known applications and existing tags. In these embodiments, the tagging module 215 may incorporate information of the graph into the prompt for the LLM. For example, the tagging module 215 may generate the following prompt, > You are a master app labeler. You have deep understanding of the interests and user preferences of apps. You know that apps are related based on the relationships in <graph>. Give me the top ten ranked interests for <application name>.

The tagging module 215 may generate a prompt for the LLM based on a portion of the graph that includes a subset of the graph's nodes. The tagging module 215 may select the portion of the graph based on the name of the application or signals extracted from the application (e.g., by the signal extraction module 210). By generating a prompt with a portion of the graph rather than the entire graph, the tagging module 215 provides only the most relevant information of the graph to the LLM, saving on processing power. The tagging module 215 may request that the LLM generate tags for the application that match the known tags in the graph. For example, the tagging module 215 may generate the following prompt, > "You are a master app labeler. You have deep understanding of the interests and user preferences of apps. Give me the top ten ranked interests for <application name>, where the interests are one of <known tags>."

Alternatively, the tagging module 215 may request that the LLM generate tags that are new tags. For example, the tagging module 215 may generate the following prompt, > "You are a master app labeler. You have deep understanding of the interests and user preferences of apps. Give > me the top ten ranked interests for <application name>, where the interests are not one of <known tags>."

In some embodiments, the tagging module 215 may select the prompt from a set of pre-generated template prompts, such as the example prompts provided above. The tagging module 215 may select the prompt based on the name of the application or based on signals extracted from the application (e.g., by the signal extraction module).

The tagging module 215 provides the prompt to the LLM and receives, as output from the LLM, candidate tags. Tag generation using an LLM provides advantages over other methods of tag generation. Manual labeling of applications with tags requires expertise on account of the labeler and a considerable time investment, while an LLM does not. Traditional machine learning based techniques require machine learning models to be trained using a subset of an existing graph as training data. In embodiments where the graph is empty or sparsely populated, traditional machine learning techniques are either impossible or provide inaccurate results due to zero or very little training data. An LLM, on the other hand, can generate tags when the graph is empty (e.g., before a graph has been created), sparsely populated, or without knowledge from a graph at all.

The tagging module 215 may classify candidate tags as known tags using a tag classifier. The tag classifier may be a supervised machine learning model that performs classification (e.g., k-nearest neighbors, naïve bayes, decision tree, etc.) or a large language model (LLM) that performs zero-shot classification. Known tags are tags that already exist in the graph database 260 and may be connected to other nodes. The tagging module 215 inputs each of the candidate tags into the tag classifier and receives, as output from the tag classifier, a known tag that corresponds to each of the candidate categories. In some embodiments, the tagging module 215 may determine that a candidate tag has no matching known tag. A candidate tag that does not match a known tag in the graph may be referred to herein as an "unknown" tag. In these embodiments, the tagging module 215 may either discard the unknown tag (e.g., not use the candidate tag as a tag for the application) or may add the unknown tag as a new tag for the application. By adding the unknown tag as a new tag for the application, the tagging module 215 effectively turns the unknown tag into a known tag that may be used to tag other applications in the future. Training of the tag classifier is described with respect to the model training module 220.

The model training module 220 trains machine learning models (e.g., for tag candidate generation) and classification models (e.g., for post-processing tag candidates). In some embodiments, the model training module 220 trains a machine learning model (e.g., a model in the machine learning model database 255) to receive a set of signals of an application as an input and to output known tags that correspond to the application. The model training module 220 trains the model using a training set of signals labeled by known tags. In some embodiments, the training data for the machine learning model may be subsets of the graph. For example, the training data may be sets of nodes corresponding to applications, where each node is labeled with one or more known tags and has a data structure that maps a set of signals to the application. The signals may be stored in application signal database 245. As mentioned in the foregoing, in some embodiments the model training module 220 may train a plurality of models, each model tuned to a particular context and trained using training examples that correspond to the particular context. The model training module 220 may continually retrain models as new feedback is received or as new nodes are added to the graph. For example, as a node in the graph receives a new signal, for example if a new feature is added to the application the node represents, the model training module 220 may incorporate the new signal into training data and retrain the machine learning model.

In some embodiments, the model training module 220 may train machine learning models on the fly. For example, the model training module 220 may train a machine learning model in response to the new application detection module 205 detecting a new application. To achieve this, an index may be established that maps subsets of training data to representative signals. For example, a representative signal may be that the application has "audio" in the name. The example representative signal may be mapped to training data that includes signals of audio applications labeled by tags. In response to the new application detection module 205 detecting a new application and the signal extraction module 210 extracting signals from the new application, the model training module 220 may compare the extracted signals to the representative signals. For any signals that match the representative signals in the index, model training module 220 may access training data mapped to those representative signals and use the accessed training data to train a machine learning model on the fly. This enables a high degree of accuracy in predicting tags for the new application, as the model is fine-tuned to the signals of the new application.

In some embodiments, the model training module 220 trains a tag classifier to categorize candidate tags into known tags. The model training module 220 trains the tag classifier to receive, as input, one or more candidate tags and to output one or more known tags that the candidate tags match or fit into. Training data may include example tags labeled with a matching known tag. For instance, example tags "baseball," "basketball," and "hockey" may all be labeled by the known tag "sports," while example tags "style," and "couture," may be labeled by the known tag "fashion." In some embodiments, training data may include example tags labeled as an "other" label, in the case that a matching known tag does not exist. For example, example tag "farming" may not fit into either the "sports" or "fashion" tags, and thus may be labeled with "other." In some embodiments, training data may include example tags labeled by two or more matching known tags.

In some embodiments, the model training module 220 trains an application classifier to categorize candidate applications into known applications. As with the tag classifier, the application classifier may be any type of classifier (e.g., k-nearest neighbors, naïve bayes, decision tree, etc.) or be an LLM classifier. Known applications are applications that already exist in the graph database 260 as nodes. Known applications may have various signals and tags assigned to them. The model training module 220 trains a classifier to receive, as input, one or more candidate applications and to output one or more known applications that match the candidate applications match. Training data may include example applications labeled by matching known applications. For instance, an example application "automotive insurance" may be labeled with the known application "Automotive Insurance." In some embodiments, training data may include example applications labeled by an "other" label in the case that a matching application does not exist. In these embodiments, the tagging module 215 may communicate with the graph update module 225 to add the application as a new node in the graph.

The graph update module 225 updates the graph with new information. The graph update module 225 may access the graph from graph database 260. The graph update module 225 may add new nodes to the graph along with corresponding signals and tags. In adding a new node, the graph update module 225 creates a new node and indicates the type of node (e.g., application or user). The graph update module 225 associates the new node with a data structure containing the signals extracted by signal extraction module 210, which may be stored in application signal database 245. The graph update module 225 forms edges between the new node and tags associated with the application, adding new tags to the graph, or connecting the new node to known tags, as necessary. In the case where the node represents a user, the graph update module 225 may form edges between the new node and nodes representing applications that the user interacts with. In some embodiments, the graph update module 225 may assign weights to the edges based on confidence levels generated by the tagging module 215. The graph update module 225 may update existing nodes in the graph, for example adding or removing signals or tags and updating edge weights. Graph update module 225 stores the updated graph in graph database 260.

The query module 230 receives natural language queries for information from the graph and provides responses to the queries. In some embodiments, the query module 230 receives queries describing applications or tags. For example, the query module 230 may receive queries like "Sports Application," "Application for Gardening," or "Fitness." The query module 230 may receive a query for a specific application or a specific tag (e.g., to find connected tags or applications respectively). The query module 230 may receive a query for a group of applications or tags (e.g., "applications for kids," "top five applications worldwide"). In some embodiments, the query module 230 may receive queries describing personas. A persona may describe characteristics of a user or a demographic. For example, a persona may be "people who want to buy cars," "dog owner," "new driver," "runner," "homeowner," or "commuter in San Francisco." The query module 230 may receive the query from a user of the client device 110. For example, if a user wants to learn more about what apps runners are using, they might input a query "running" or "runner" into a user interface of the client device 110, and the graph augmentation system 130 may receive the query from the client device 110. The query may be a natural language query of any length (subject to fitting within the LLM context window length) or format. For example, a natural language query for a persona of people who run may look like "people who run," "runners," "marathoners," or "cross-country athletes."

The query module 230 may process received queries using an LLM. The query module 230 generates a prompt for the LLM based on a received query. The LLM may be an open-source LLM. The LLM may, in some embodiments, be the same LLM referred to in the description of the tagging module 215. The prompt may include the text of the query along with a request. For a query pertaining to an application or tag (e.g., "what apps do people who are newly single & just moved use?"), the request may be that the LLM provide nodes or tags in the graph that may answer the question posed by the query. For example, the query module 230 may generate the prompt, You are a mobile app ecosystem expert. Identify information in <graph> that answers the question posed by or is relevant to <query>.

For a query pertaining to a persona (e.g., people who want to buy cars), the request may be that the LLM provide applications relevant to the persona the query describes. For example, the query module 230 may generate the prompt, >    You are a mobile app ecosystem expert. Provide a list of ten apps that a user having the persona <persona> would use.

The query module 230 provides the prompt to the LLM as input and receives, as output, either a plurality of candidate applications and candidate tags (e.g., for an application or tag query) or only a plurality of candidate applications (e.g., for a persona query).

The query module 230 matches the output of the LLM to known tags or applications. The query module 230 may match the output of the LLM to tags using the tag classifier described with respect to the tagging module 215. The query module 230 may match the output of the LLM to applications using an application classifier. Like the tag classifier described in the tagging module 215, the application classifier may be any type of classifier (e.g., k-nearest neighbors, naïve bayes, decision tree, etc.) or be an LLM classifier. A known application is an application that already exists in the graph and may be represented in the graph by a node. The query module 230 inputs each of the candidate applications into the application classifier and receives, as output from the application classifier, a known application that corresponds to each of the candidate applications. Training of the application classifier is described with respect to the model training module 220. In some embodiments, the query module 230 matches the candidate applications to known applications by performing fuzzy matching between the names of the candidate application and the names of the known applications.

In some embodiments, the query module 230 may skip using an LLM and matching the output of the LLM to known tags and applications. For example, rather than receive a natural language query, the query module 230 may receive a query that is a selection (e.g., via a dropdown menu) from a set of known applications or known tags, and thus not have to input the query into an LLM to identify the known applications or known tags that the query corresponds to. The query module 230 may receive a query that is a selection from a set of pre-existing personas. In this case, the query module 230 may simply access a mapping that maps the persona to known applications. For example, the query "people who like to run" may map to known running and fitness applications.

In some embodiments, the query module 230 selects an LLM from a set of different LLMs and provides the generated prompt to the selected LLM. Different LLMs may differ in model-type, architecture, size (number of parameters), training data, memory, accuracy, or cost to run. High accuracy models may be larger in size and require more computing power than lower accuracy models. In selecting an LLM from the set of different LLMs, the query module 230 may balance different model features. For example, to reduce the computing power associated with processing a query, the query module 230 may select a model with lower accuracy.

In some embodiments, the query module 230 may compute a complexity score of the query and, based on the complexity score, select an LLM to provide the generated prompt. The query module 230 may compute the complexity score based on the length of the query, the similarity of the query to previous queries (e.g., logged by the query module 230), or any other factor of the query. The query module 230 may compare the complexity score of the query to a set of complexity thresholds. Based on where the complexity score falls within the complexity thresholds, the query module 230 selects an LLM and provides the generated prompt to the LLM.

In some embodiments, the query module 230 determines a quality score of a known application. The quality score of a known application may be a measure of how relevant the known application is to the query. The query module 230 may base the quality score of the known application on a popularity score of the known application, an affinity score of the known application, or a rating of the known application in an application store, where a higher popularity, affinity, or rating corresponds to higher quality score. The query module 230 may determine the known application's popularity score based on the number of connected user nodes. The query module 230 may determine the affinity score of the known application, the affinity score representing the affinity of the known application to a particular user. The query module 230 may determine the affinity score based on how close the user node and application node are in the graph (e.g., how many edges are between them). For example, the query module 230 may determine that an application has a high affinity score if the application and user nodes are connected by an edge in the graph. The query module 230 may determine the affinity score of the known application using a cross-app affinity table (e.g., the cross-app affinity table 240). The cross-app affinity table describes similarity between applications and may represent, for each application, the likelihood that a user of the application would also be a user of each of the other applications. The cross-app affinity table may be constructed from the information in the graph, namely, from connections between user and application nodes. From the cross-app affinity table, the query module 230 may determine a user's affinity for an application they do not use, based on the applications they do use. In some embodiments, the query module 230 may reference the cross-app affinity table to expand the results of the LLM. For example, for an application output by the LLM, the query module 230 may use the cross-app affinity table to find similar applications and may provide those applications as a response to the query. An example cross-app affinity table is shown in FIG. 8.

In some embodiments, the query module 230 may generate a second prompt for the LLM. The query module 230 may determine that the quality scores of the output of the first prompt (e.g., the candidate applications) do not exceed a threshold quality score and, in response, may generate the second prompt. The query module 230 may generate the second prompt to include more information than the first prompt. For example, the query module 230 may generate a second prompt that is longer than the first prompt. In another example, the query module 230 may generate the second prompt based on the first prompt or the output of the first prompt. For instance, the second prompt may be:

>    You are a mobile app ecosystem expert. You previously responded to <first prompt> with <output of first prompt>. This time, provide a list of ten apps that a user having the persona <persona> would use such that the ten apps are more popular than <output of first prompt>.

By generating a second prompt in response to the output of the first prompt not exceeding a threshold quality score, the query module 230 provides higher quality recommendations (e.g., candidate applications) in response to the query. Moreover, as more complex prompts (e.g., longer, more detailed, containing more information) typically require more computing power for an LLM to process, the query module 230 saves on computing power by only providing a more complex prompt (e.g., the second prompt) in situations where the quality scores of the output of the first prompt are below a threshold quality score.

In some embodiments, in response to the quality score not meeting the threshold quality score, the query module 230 may provide the first prompt to a second LLM. The query module 230 may provide the first prompt to a second LLM with higher accuracy than the previously used LLM. Higher accuracy LLMs typically require more computing power than lower accuracy LLMs. The query module 230 saves on computing power by only providing the prompt to a higher accuracy LLM in situations where the quality scores of the output of the first prompt are below a threshold quality score.

Figure 9:
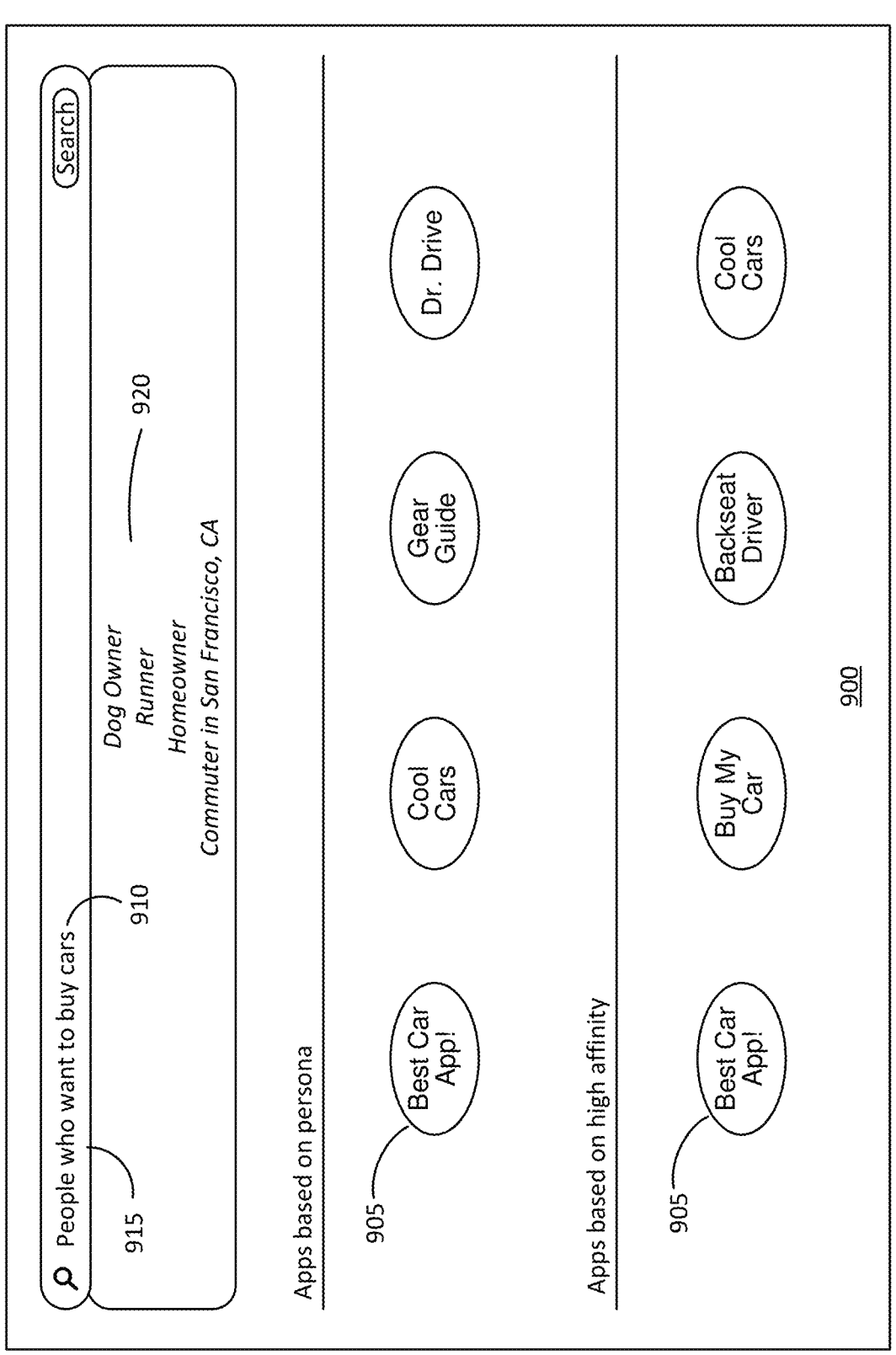
FIG. 9 illustrates an example user interface for receiving and responding to queries describing a persona, according to one embodiment.

The query module 230 provides a response to the query based on the known application or known tag corresponding to the query. The response may include information pertaining to the known application or known tag, such as other nodes or tags connected by an edge, edge weights of those connections, signals stored in a data structure related to the known application (e.g., Application Signal Database 245), or the quality of the known application. In some embodiments, the query module 230 may provide a portion of the graph as a response to the query. The query module 230 may provide the response for display at a user interface. An example of a user interface is shown in FIG. 9.

Graph Augmentation for New Application

Figure 3:
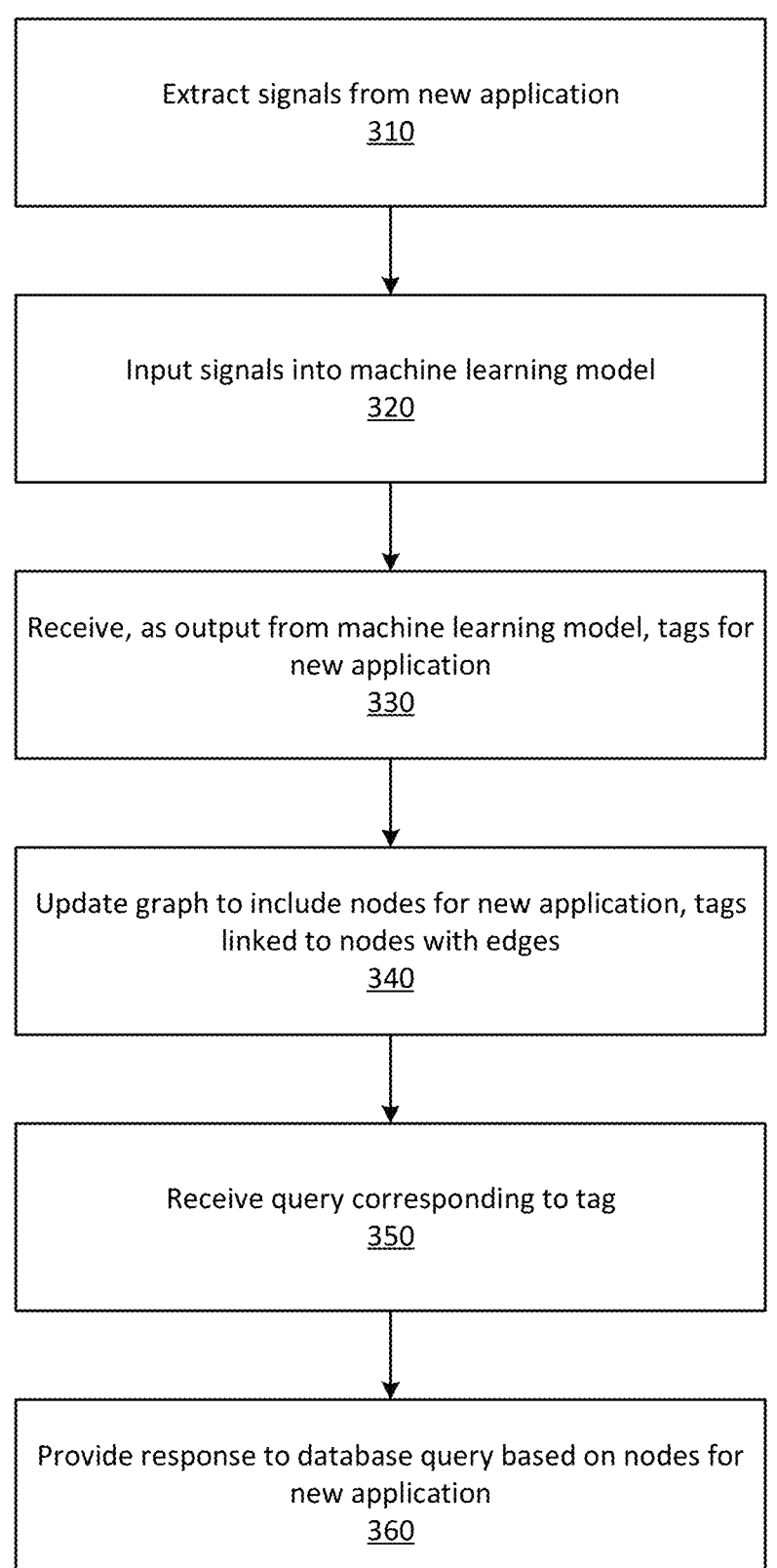
FIG. 3 illustrates a flow diagram for augmenting a graph based on a new application, according to one embodiment.

FIG. 3 illustrates a flow diagram for augmenting a graph based on a new application, according to one embodiment. The process of FIG. 3, performed by the graph augmentation system 130, begins with the graph augmentation system 130 extracting 310 signals from a new application (e.g., using the signal extraction module 210). The graph augmentation system 130 may extract a signal from the new application, an application store, application signal database 245, or an external source. To extract from the new application, the graph augmentation system 130 may scan the new application's graphical user interface and store information displayed on each page of the new application. To extract from an application store, the graph augmentation system 130 steps through and stores the information presented in the application store.

The graph augmentation system 130 inputs 320 the signals into a machine learning model (e.g., using the tagging module 215). The graph augmentation system 130 may input all or some of the signals into the machine learning model and may weight signals before input into the machine learning model. The graph augmentation system 130 may select the machine learning model from a plurality of candidate machine learning models based on the signals of the new application.

The graph augmentation system 130 receives 330, as output from the machine learning model, a set of known tags corresponding to the new application and levels of confidence for each tag (e.g., using the tagging module 215). The graph augmentation system 130 may compare the confidence level for each tag to a threshold confidence level and, in response to the confidence level exceeding the threshold confidence level, use the confidence level as an edge weight between the tag and a node for the new application.

The graph augmentation system 130 updates 340 the graph to include one or more nodes corresponding to the new application (e.g., using the graph update module 225). The graph augmentation system 130 creates the one or more nodes and indicates that the one or more nodes correspond to the new application. The graph augmentation system 130 may associate the one or more nodes with a data structure containing the extracted signals of the new application. The graph augmentation system 130 forms edges between the one or more nodes and the tags corresponding to the application. The graph augmentation system 130 links each tag to the one or more nodes with an edge. The edge has a weight corresponding to the level of confidence of the tag.

The graph augmentation system 130 receives 350 a query corresponding to a tag in the set of tags (e.g., using the query module 230). The graph augmentation system 130 may receive the query from a user of the client device 110. The graph augmentation system 130 may search the graph for the tag and identify nodes connected to the tag by an edge, the nodes including the one or more nodes related to the application. The graph augmentation system 130 provides 360 a response to the query (e.g., using the query module 230). The response may include the nodes connected to the tag. The graph augmentation system 130 may provide a portion of the graph as a response to the query. The graph augmentation system 130 may provide the response for display at a user interface.

Tagged Label Generation

FIG. 4 illustrates a flow diagram for generating tagged labels (e.g., interests) for an application according to one embodiment. The process of FIG. 4, performed by the graph augmentation system 130, may be used to generate tagged interests for applications when the graph is empty or sparsely populated. The process may also be used as an alternative to manual generation of tags.

The graph augmentation system 130 receives 410 a name of an application. The graph augmentation system 130 may receive the name from a user of a client device 110 or may extract the name as a signal of the application (e.g., using the signal extraction module 210). The graph augmentation system may sanitize the name of the application by translating the name of the application and removing non-text characters (e.g., using the signal processing module 212).

The graph augmentation system 130 generates 420 a prompt for a large language model (LLM) based on the title of the application (e.g., using the tagging module 215). The graph augmentation system generates the prompt to include the name of the application and a request for the LLM to generate one or more tags associated with the application. The graph augmentation system 130 may incorporate information of the graph into the prompt for the LLM. The graph augmentation system 130 provides 425 the prompt to the LLM for execution and receives 430, as output from the LLM, a plurality of candidate tags (e.g., using the tagging module 215).

The graph augmentation system 130 inputs 440 the plurality of candidate tags into a tag classifier (e.g., using the tagging module 215). The graph augmentation system 130 receives 450, as output from the tag classifier, a plurality of known tags (e.g., using the tagging module 215). The graph augmentation system 130 may determine that a candidate tag has no matching known tag and is an unknown tag. In these embodiments, the graph augmentation system 130 may either discard the unknown tag or may add the unknown tag as a new tag.

The graph augmentation system 130 updates 460 a graph to include a node corresponding to the application (e.g., using the graph update module 225). The graph augmentation system 130 creates the node and indicates that node corresponds to the application. The graph augmentation system 130 may associate the node with a data structure containing the extracted signals of the application. The graph augmentation system 130 forms edges between the node and the known tags. The graph augmentation system 130 links each known tag to the node with an edge.

Persona Application Recommendation

FIG. 5 illustrates a flow diagram for generating application recommendations for a persona, according to one embodiment. The process of FIG. 5, performed by the graph augmentation system 130, begins with the graph augmentation system 130 receiving 510 a query from a user of a client device, wherein the query is a natural language input describing a persona (e.g., using the query module 230). The graph augmentation system 130 may receive a query that is a selection (e.g., via a dropdown menu) from a set of pre-existing personas.

The graph augmentation system 130 generates 520 a prompt for a large language model (LLM) based on the query (e.g., using the query module 230). The graph augmentation system 130 generates the prompt that requests that the LLM to generate one or more applications associated with the persona. The graph augmentation system 130 provides 525 the prompt to the LLM for execution and receives 530, as output from the LLM, a set of candidate applications (e.g., using the query module 230).

The graph augmentation system 130 inputs 540 the plurality of candidate applications into a classifier, the classifier trained to classify candidate applications into known applications, wherein known applications are applications that already exist in a graph (e.g., using the query module 230). The graph augmentation system 130 receives 530, as output from the classifier, a plurality of known applications (e.g., using the query module 230).

The graph augmentation system 130 determines 560, for each known application in the plurality of known applications, a quality score of the known application (e.g., using the query module 230). The graph augmentation system 130 determines the quality score based on popularity of the known application, an affinity of the known application to a particular user, or a rating of the known application in an application store, where a higher popularity, affinity, or rating corresponds to higher quality. The graph augmentation system 130 may determine the affinity of the known application to a particular user using a cross-app affinity table. The graph augmentation system 130 determines 570 that the quality score for each known application meets a quality threshold (e.g., using the query module 230).

The graph augmentation system 130, responsive to determining that quality scores for each known application meets a quality threshold, provides 580 the known applications for display at a user interface (e.g., using the query module 230).

Example Graph

Figure 6A:
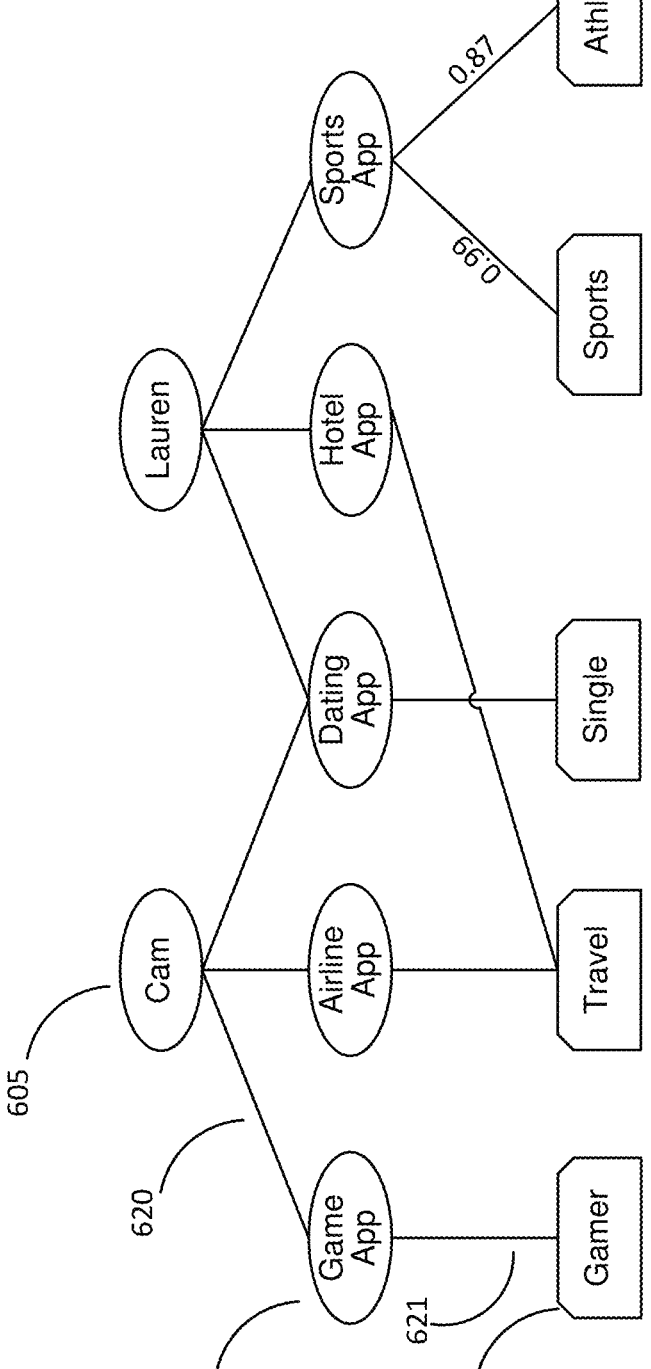
FIG. 6A illustrates an exemplary graph with nodes and tags, according to one embodiment.

FIG. 6A illustrates an exemplary graph with nodes and tags, according to one embodiment. A graph 600 includes a set of nodes and tags connected by edges. The graph 600 includes nodes 605 that represent users (e.g., "Cam"), nodes 606 that represent applications (e.g., "Game App"), and tags 610 that describe nodes (e.g., "Gamer"). Nodes 605 representing users and nodes 606 representing applications are connected by edges 620. Nodes 606 representing applications and tags 610 are connected by edges 621. The edges 620 and 621 represent relationships between the nodes and tags they connect. For example, the edge 621 between the node 606 "Airline App" and the tag 610 "Travel" indicates that there is a connection between the application "Airline App" and the interest "Travel." Going one level up in the graph 600, the node 606 "Airline App" is connected to the node 605 "Cam" by an edge 620, indicating that the user "Cam" is a user of the application "Airline App." The edges 620 and 621 may be weighted based on the level of confidence in the relationship between the nodes or tags being connected. For example, the edge 621 between node 606 "Sports App" and tag 610 "Sports" has a weight of 0.99 and the edge 621 between node 606 "Sports App" and tag 610 "Athlete" has a weight of 0.87. The weight of an edge indicates the strength of the relationship between a node and its tag. For example, the node 606 "Sports App" has a stronger relationship to the "Sports" tag than the "Athlete" tag because there is greater confidence informing that link. Additionally, graph 600 illustrates that tags 610 may link to multiple corresponding nodes 605 or 606 (e.g., "Travel" corresponds to both "Airline App" and "Hotel App") and that nodes 605 or 606 may have multiple corresponding tags 610 (e.g., "Sports App" corresponds to both "Sports" and "Athlete").

In some embodiments, the query module 230 may receive a query describing a node and/or tag in graph 600. For example, the query module 230 may receive a query for node 606 "Dating App." To respond to the query, the query module 230 may search the graph to locate the node 606 "Dating App" and may identify that tag 610 "Single" connects to "Dating App" through edge 621 and nodes 605 "Cam" and "Lauren" connect to "Dating App" through edges 620. The query module 230 may provide a response that includes "Single," "Cam," and "Lauren."

Figure 6B:
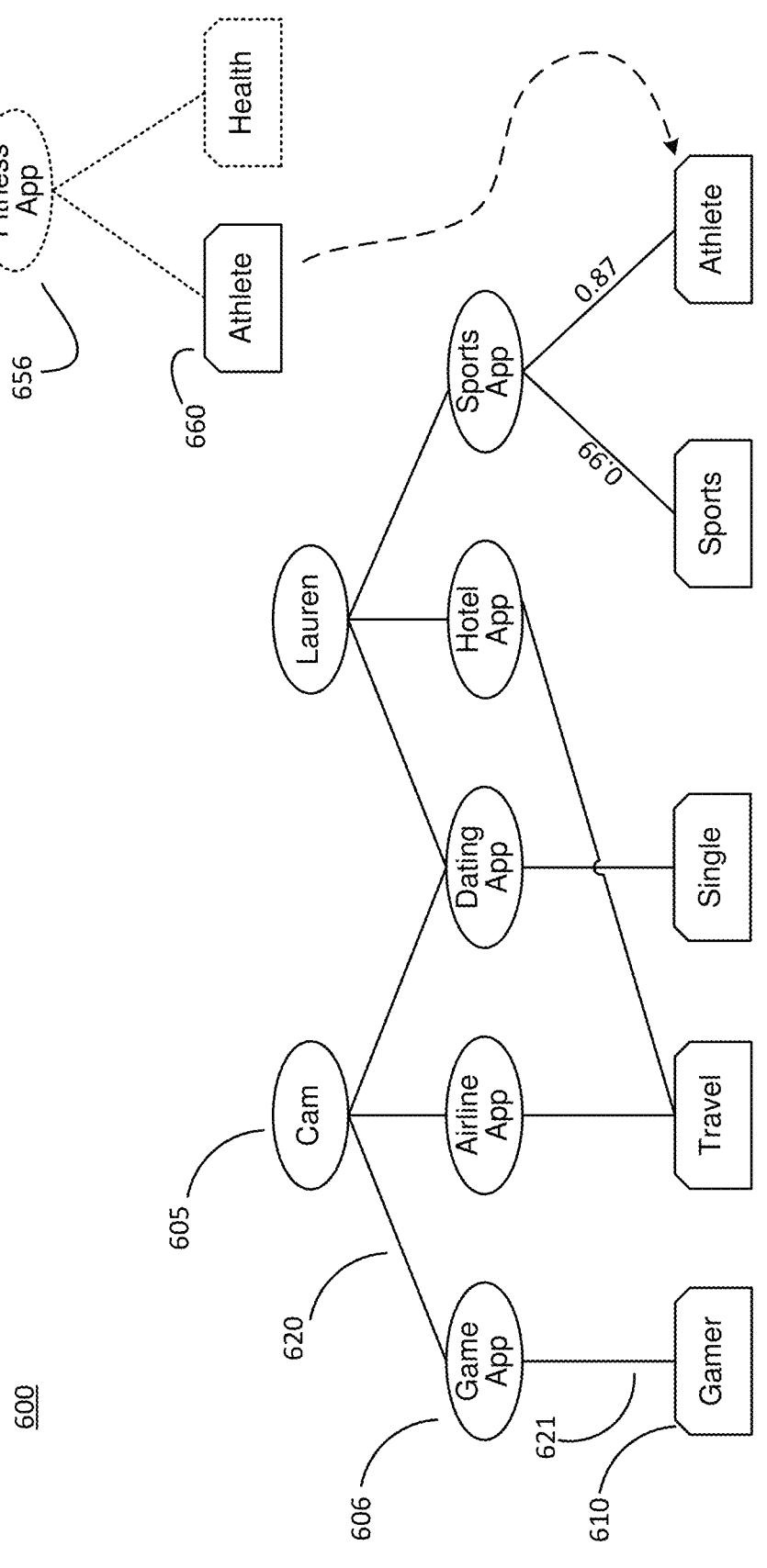
FIGS. 6B and 6C illustrate the exemplary graph with nodes and tags with the addition of a new application, according to one embodiment.
Figure 6C:
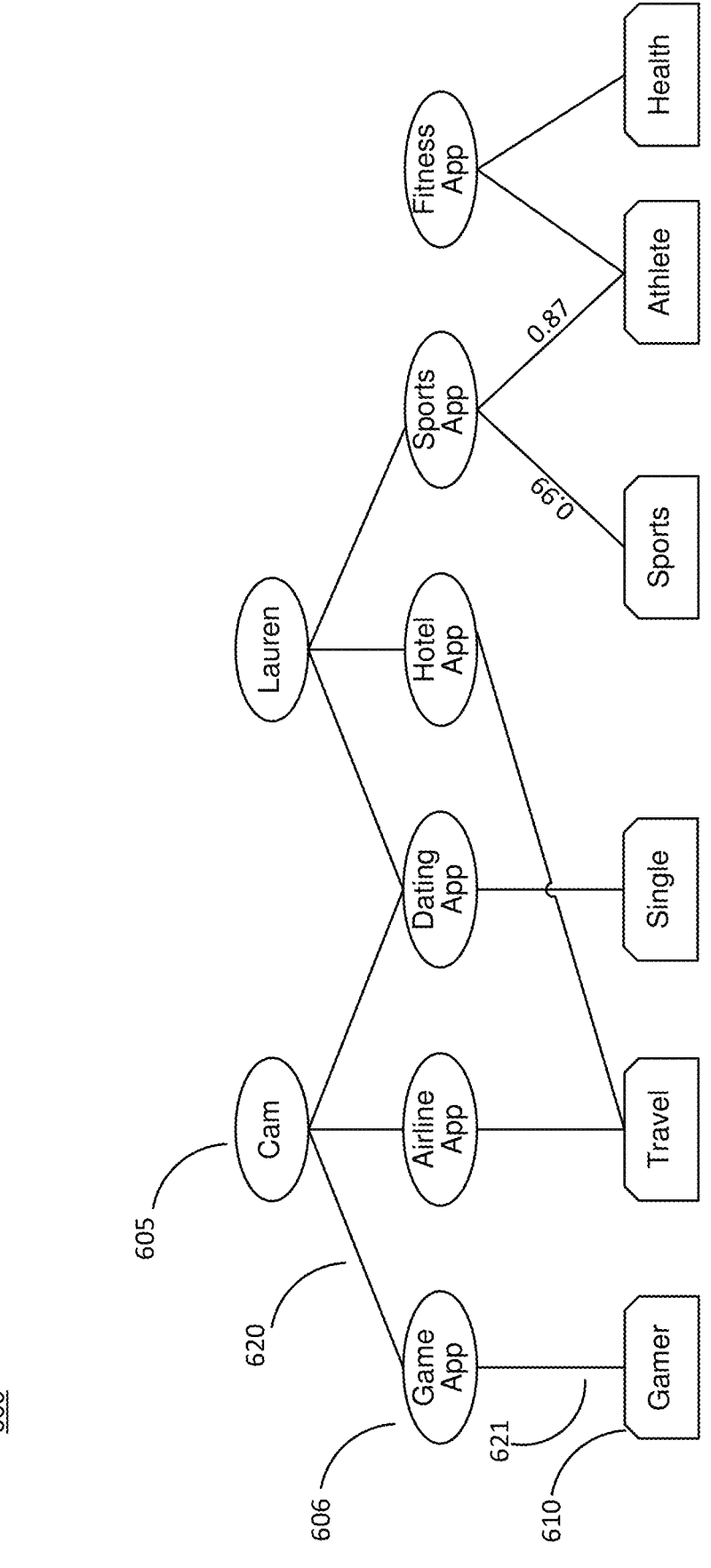

FIGS. 6B and 6C illustrate the exemplary graph with nodes and tags with the addition of a new application, according to one embodiment. The new application 656, "Fitness App" has corresponding tags 660, "Athlete" and "Health." Tag 660 "Athlete" is a known tag, as it exists in the graph 600 already as a tag 610. Tag 660 "Health" is a new tag, as it does not exist in the graph 600. The graph update module 225 may update the graph 600 to include the new application 656 along with the known tag 660 and the new tag 660. The graph update module 225 creates the new node 656 and indicates that the node is for an application. The graph update module 225 adds a new tag 660 "Health" to the graph. The graph update module 225 forms edges 621 between the tags 660 "Athlete" and "Health" and the node 656 "Fitness App." The updated graph is depicted in FIG. 6C.

Example Signals and Tags

Figure 7:
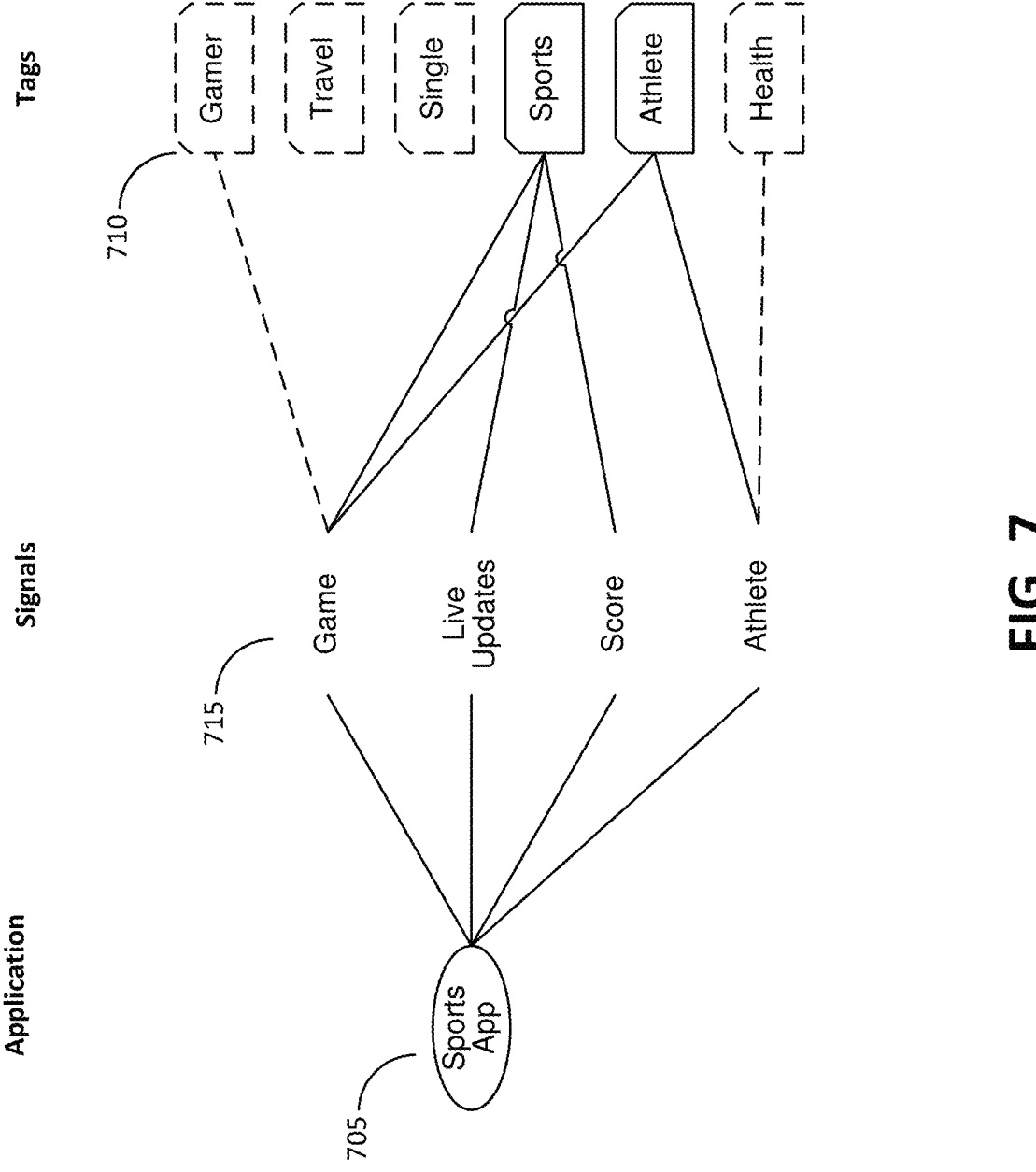
FIG. 7 illustrates example signals and tags for an application, according to one embodiment.

FIG. 7 illustrates example signals and tags for an application, according to one embodiment. FIG. 7 illustrates signals 715 and tags 710 for an application 705, "Sports App." The signal extraction module 210 extracts signals 715 from the application 705. In this example, the signals 715 for the application 705 "Sports App" are "Game," "Live Updates," "Score," and "Athlete." Note that, in some embodiments, the signals 715 may be text extracted from the application 705. For instance, the signal 715 "Score" may come from text on the GUI of the application 705. In some embodiments, the signals 715 may be features that the signal extraction module 210 has extracted from the app that are not necessarily text. For instance, the signal 715 "Live Updates" may not be text from the GUI of the application 705 but may be inferred by the signal extraction module 210 based on features of the application 705 (e.g., live stream video, page refreshing, notifications, etc.).

The tagging module 215 determines tags 710 to assign to the application 705. In this example, the known tags 710 are "Gamer," "Travel," "Single," "Sports," "Athlete," and "Health." In some embodiments, the tagging module may first match the signals 715 with keywords and then map the keywords to tags. For the sake of simplicity, FIG. 7 depicts how different signals 715 relate to different tags 710. For example, the signal 715 "Game" may relate to tags 710

"Gamer," "Sports," and "Athlete." The tagging module 215 may determine that some tags match better with others. For example, tags 710 "Travel" and "Single" are not related to any signals 715 and tags 710 "Gamer" and "Health" are each only connected to one signal. The tagging module 215 may assign tags 710 "Sports" and "Athlete" to the application 705 "Sports App" due to those tags having the greatest number of related signals.

Example Cross-App Affinity Table

FIG. 8 illustrates an example cross-app affinity table, according to one embodiment. The cross-app affinity table 800 shows cross-app affinity values 810 calculated from pairs of applications 805. In this example, the cross-app affinity values 810 may range from 0 to 1, with high values corresponding to higher affinity between the applications. For example, the cross-app affinity between "Sports App" and "Fitness App" is 0.9 while the cross-app affinity between "Sports App" and "Hotel App" is 0.3. This indicates that users of "Sports App" are more likely to be users of "Fitness App" than of "Hotel App."

1. Example User Interface

FIG. 9 illustrates an example user interface for receiving and responding to queries describing a persona, according to one embodiment. The interface 900 includes a search bar 915 for a user of the client device 110 to input a query 910. The interface 900 also provides suggested queries 920, where the suggested queries 920 describe different personas. In this example, the query input by a user is "People who want to buy cars." The query module 230 receives the query 910 and generates a prompt to provide to an LLM. The query module 230 receives an output from the LLM and provides a response to the query in the form of applications 905 that relate to the persona described by the query 910. In this example, the query module 230 provides both applications based on persona and applications based on high affinity.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

Upon reading this disclosure, those of skill in the art will appreciate still additional alternative structural and functional designs for a system and a process for augmenting a graph based on a new application by extracting signals from an application, predicting tags based on those signals, and responding to and a query of the augmented graph through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A method for generating application recommendations for a persona, the method comprising:
   receiving input of a natural language query describing a persona;
   generating a prompt for a large language model (LLM) based on the natural language query, wherein the prompt includes a request for an identification of one or more applications associated with the persona;
   providing the prompt to the LLM for execution;
   receiving, as output from the LLM, a set of candidate applications;
   inputting the set of candidate applications into one or more classifiers, the one or more classifiers trained to classify candidate applications into known applications, wherein the known applications are applications that have corresponding nodes that already exist in one or more graphs;
   receiving, as output from the one or more classifiers, a set of known applications;
   determining, for each known application in the set of known applications, a quality score of the known application;
   determining, for each known application in the set of known applications, whether the quality score of the known application exceeds a threshold quality score; and
   responsive to determining, for each known application in the set of known applications, that the quality score of the known application exceeds the threshold quality score, providing the set of known applications for display at one or more user interfaces.

2. The method of claim 1, further comprising:
   responsive to determining that the quality score of at least one known application of the set of known applications does not exceed the threshold quality score, generating a second prompt for the LLM;
   providing the second prompt to the LLM for execution;
   receiving, as output from the LLM, a second set of candidate applications;
   inputting the second set of candidate applications into the one or more classifiers, the one or more classifiers trained to classify candidate applications into known applications, wherein the known applications are applications that already exist in the one or more graphs;
   receiving, as output from the one or more classifiers, a second set of known applications; and
   providing the second set of known applications for display at the one or more user interfaces.

3. The method of claim 2, wherein the second prompt is based on the prompt for the LLM and the output of the LLM.

4. The method of claim 1, wherein determining, for each known application in the set of known applications, the quality score of the known application comprises:
   determining, for each known application in the set of known applications, an affinity score of the known application based on a cross-app affinity table, the affinity score representing an affinity between the known application and a particular user; and
   computing the quality score based on the affinity score.

5. The method of claim 1, wherein determining, for each known application in the set of known applications, the quality score of the known application comprises:
   determining, for each known application in the set of known applications, a popularity score of the known application based on the one or more graphs; and
   computing the quality score based on the popularity score.

6. The method of claim 1, wherein the one or more classifiers include one of a supervised machine learning model or an LLM that performs zero-shot classification.

7. The method of claim 1, wherein the natural language query includes a selection from a set of pre-existing personas.

8. The method of claim 7, further comprising mapping the natural language query to one or more known applications.

9. A non-transitory computer-readable medium comprising memory with instructions encoded thereon, the instructions, when executed by one or more processors, causing the one or more processors to perform operations, the instructions comprising instructions to:
   receive input of a natural language query describing a persona;
   generate a prompt for a large language model (LLM) based on the natural language query, wherein the prompt includes a request for an identification of one or more applications associated with the persona;
   provide the prompt to the LLM for execution;
   receive, as output from the LLM, a set of candidate applications;
   input the set of candidate applications into one or more classifiers, the one or more classifiers trained to classify candidate applications into known applications, wherein the known applications are applications that have corresponding nodes that already exist in one or more graphs;
   receive, as output from the one or more classifiers, a set of known applications;
   determine, for each known application in the set of known applications, a quality score of the known application;
   determine, for each known application in the set of known applications, whether the quality score of the known application exceeds a threshold quality score; and
   responsive to determining, for each known application in the set of known applications, that the quality score of the known application exceeds the threshold quality score, provide the set of known applications for display at one or more user interfaces.

10. The non-transitory computer-readable medium of claim 9, wherein the instructions further comprise instructions to:
   responsive to determining that the quality score of at least one known application of the set of known applications does not exceed the threshold quality score, generate a second prompt for the LLM;
   provide the second prompt to the LLM for execution;
   receive, as output from the LLM, a second set of candidate applications;
   input the second set of candidate applications into the one or more classifiers, the one or more classifiers trained to classify candidate applications into known applications, wherein the known applications are applications that already exist in the one or more graphs;
   receive, as output from the one or more classifiers, a second set of known applications; and
   provide the second set of known applications for display at the one or more user interfaces.

11. The non-transitory computer-readable medium of claim 10, wherein the second prompt is based on the prompt for the LLM and the output of the LLM.

12. The non-transitory computer-readable medium of claim 9, wherein the instructions for determining, for each known application in the set of known applications, the quality score of the known application comprise instructions to:

determine, for each known application in the set of known applications, an affinity score of the known application based on a cross-app affinity table, the affinity score representing an affinity between the known application and a particular user; and compute the quality score based on the affinity score.

13. The non-transitory computer-readable medium of claim 9, wherein the instructions for determining, for each known application in the set of known applications, the quality score of the known application comprise instructions to:

determine for each known application in the set of known applications, a popularity score of the known application based on the one or more graphs; and compute the quality score based on the popularity score.

14. The non-transitory computer-readable medium of claim 9, wherein the one or more classifiers include one of a supervised machine learning model or an LLM that performs zero-shot matching.

15. The non-transitory computer-readable medium of claim 9, wherein the natural language query includes a selection from a set of pre-existing personas.

16. The non-transitory computer-readable medium of claim 15, wherein the instructions further comprise instructions to map the natural language query to one or more known applications.

17. A system comprising:

memory with instructions encoded thereon; and one or more processors that, when executing the instructions, are caused to perform operations comprising:

receiving input of a natural language query describing a persona;

generating a prompt for a large language model (LLM) based on the natural language query, wherein the prompt includes a request for an identification of one or more applications associated with the persona;

providing the prompt to the LLM for execution;

receiving, as output from the LLM, a set of candidate applications;

inputting the set of candidate applications into one or more classifiers, the one or more classifiers trained to classify candidate applications into known applications, wherein the known applications are applications that have corresponding nodes that already exist in one or more graphs;

receiving, as output from the one or more classifiers, a set of known applications;

determining, for each known application in the set of known applications, a quality score of the known application;

determining, for each known application in the set of known applications, whether the quality score of the known application exceeds a threshold quality score; and responsive to determining, for each known application in the set of known applications, that the quality score of the known application exceeds the threshold quality score, providing the set of known applications for display at one or more user interfaces.

18. The system of claim 17, wherein the operations further comprise:

responsive to determining that the quality score of at least one known application of the set of known applications does not exceed the threshold quality score, generating a second prompt for the LLM;

providing the second prompt to the LLM for execution;

receiving, as output from the LLM, a second set of candidate applications;

inputting the second set of candidate applications into the one or more classifiers, the one or more classifiers trained to classify candidate applications into known applications, wherein the known applications are applications that already exist in the one or more graphs;

receiving, as output from the one or more classifiers, a second set of known applications; and providing the second set of known applications for display at the one or more user interfaces.

19. The system of claim 18, wherein the second prompt is based on the prompt for the LLM and the output of the LLM.

20. The system of claim 17, wherein the operations for determining, for each known application in the set of known applications, the quality score of the known application comprise:

determining, for each known application in the set of known applications, an affinity score of the known application based on a cross-app affinity table, the affinity score representing an affinity between the known application and a user; and computing the quality score based on the affinity score.

* * * * *